United States Patent
Yamada (10) Patent No.: US 11,260,735 B2
(45) Date of Patent: Mar. 1, 2022

(54) BELT LINE PORTION SOUND INSULATION STRUCTURE FOR AUTOMOBILE AND DOOR GLASS FOR AUTOMOBILE

(71) Applicant: AGC Inc., Chiyoda-ku (JP)

(72) Inventor: Daisuke Yamada, Tokyo (JP)

(73) Assignee: AGC Inc., Chiyoda-ku (JP)

( * ) Notice: Subject to any disclaimer, the term of this patent is extended or adjusted under 35 U.S.C. 154(b) by 99 days.

(21) Appl. No.: 16/683,498

(22) Filed: Nov. 14, 2019

(65) Prior Publication Data

US 2020/0079197 A1 Mar. 12, 2020

Related U.S. Application Data

(63) Continuation of application No. PCT/JP2018/024398, filed on Jun. 27, 2018.

(30) Foreign Application Priority Data

Jul. 3, 2017 (JP) .............................. JP2017-130191

(51) Int. Cl.
| | |
|---|---|
| *B60J 1/16* | (2006.01) |
| *B60J 10/50* | (2016.01) |
| *B60J 10/15* | (2016.01) |
| *B60J 10/75* | (2016.01) |

(52) U.S. Cl.
CPC .............. *B60J 10/50* (2016.02); *B60J 10/15* (2016.02); *B60J 10/75* (2016.02)

(58) Field of Classification Search
CPC ........................................................ B60J 1/17
USPC ........................................ 49/374, 375, 376
See application file for complete search history.

(56) References Cited

U.S. PATENT DOCUMENTS

| | | | | | |
|---|---|---|---|---|---|
| 1,404,048 | A | * | 1/1922 | Nicholson | ................. E06B 3/44 49/377 |
| 1,954,268 | A | * | 4/1934 | Simpson | ................. B60J 10/75 49/377 |
| 2,069,219 | A | * | 2/1937 | Conlon | ................. B60J 10/75 49/377 |

(Continued)

FOREIGN PATENT DOCUMENTS

| | | |
|---|---|---|
| JP | 2001-219738 A | 8/2001 |
| JP | 2017-030729 A | 2/2017 |
| JP | 2017-030730 A | 2/2017 |

OTHER PUBLICATIONS

Written Opinion dated Aug. 7, 2018 in PCT/JP2018/024398 filed on Jun. 27, 2018.

*Primary Examiner* — Jerry E Redman
(74) *Attorney, Agent, or Firm* — Oblon, McClelland, Maier & Neustadt, L.L.P.

(57) ABSTRACT

A belt line portion sound insulation structure for an automobile between a door panel and door glass includes a viscoelastic member arranged on a lower portion of one of principal faces of a glass plate of the door glass. The door panel includes two panel plates facing each other, and the door glass is arranged between the two panel plates so as to be movable up and down. A hardness measured on a surface of the viscoelastic member is 10 to 80 in an Asker C hardness defined by SRIS 0101. In a closed state of the door glass, the viscoelastic member is restrained by a portion of a surface of one of the two panel plates facing the one of the principal faces and an area on one of the two panel plates where the viscoelastic member is disposed.

20 Claims, 5 Drawing Sheets

(56) References Cited

U.S. PATENT DOCUMENTS

| | | | | |
|---|---|---|---|---|
| 2,184,553 A | * | 12/1939 | Johnson | B60J 10/75 49/377 |
| 3,868,788 A | * | 3/1975 | Podolan | E05F 11/445 49/374 |
| 5,791,088 A | * | 8/1998 | Martinelli | B60J 1/16 49/375 |
| 5,870,860 A | * | 2/1999 | Heller | B60J 10/75 49/477.1 |
| 6,571,515 B1 | * | 6/2003 | Samways | B60J 5/0416 49/502 |
| 10,245,925 B2 | * | 4/2019 | Sakurai | E05F 11/382 |
| 10,293,665 B2 | * | 5/2019 | Nakamura | B32B 17/10788 |
| 2003/0009948 A1 | * | 1/2003 | Nishikawa | E05F 11/485 49/502 |
| 2006/0168892 A1 | * | 8/2006 | Dohles | B60J 5/0459 49/374 |
| 2007/0294951 A1 | * | 12/2007 | Tenorio | E05F 11/382 49/375 |
| 2017/0028830 A1 | * | 2/2017 | Yamada | B60J 10/40 |
| 2017/0028831 A1 | * | 2/2017 | Yamada | B60J 1/2097 |
| 2017/0274740 A1 | * | 9/2017 | Kosaka | B32B 17/06 |

* cited by examiner

BELT LINE PORTION SOUND INSULATION STRUCTURE FOR AUTOMOBILE AND DOOR GLASS FOR AUTOMOBILE

CROSS-REFERENCE TO RELATED APPLICATIONS

The present application is a continuation application filed under 35 U.S.C. 111(a) claiming benefit under 35 U.S.C. 120 and 365(c) of PCT International Application No. PCT/JP2018/024398 filed on Jun. 27, 2018 and designating the U.S., which claims priority of Japanese Patent Application No. 2017-130191 filed on Jul. 3, 2017. The entire contents of the foregoing applications are incorporated herein by reference.

BACKGROUND OF THE INVENTION

1. Field of the Invention

The disclosures herein relate to a belt line portion sound insulation structure for an automobile and door glass for an automobile.

2. Description of the Related Art

Conventionally, as one of methods for enhancing sound insulation property of an automobile, a method of providing a sound insulation structure along the belt line of the automobile has been employed. As such a sound insulation structure, for example, PTL 1 discloses a sound insulation structure in which a sound insulation material is provided on any one of: a lower end portion of an outer seal portion and an inner seal portion attached to a door panel; and a portion of the door glass corresponding to the lower end portion, and a protrusion in contact with the sound insulation material is provided on the other of the lower end portion and the portion corresponding to the lower end portion.

The sound insulation structure described in PTL 1 attempts to prevent the entry of sound from the outside of the automobile by closing the door panel, more specifically by closing the gap between the seal member provided on the door panel and the door glass when the door glass is closed. However, the demand for quietness in automobiles is increasing year by year, and the sound insulation structure of PTL 1 does not provide a high level of sound insulation performance satisfying the demand.

CITATION LIST

Patent Literature

[PTL 1] Japanese Laid-Open Patent Publication No. 2001-219738

SUMMARY OF THE INVENTION

According to an aspect of the embodiment, a belt line portion sound insulation structure for an automobile between a door panel and door glass includes a viscoelastic member arranged on a lower portion of one of principal faces of a glass plate of the door glass. The door panel includes two panel plates facing each other, and the door glass is arranged between the two panel plates so as to be movable up and down. A hardness measured on a surface of the viscoelastic member is 10 to 80 in an Asker C hardness defined by SRIS 0101. In a closed state of the door glass, the viscoelastic member is restrained by a portion of a surface of one of the two panel plates facing the one of the principal faces and an area on one of the two panel plates where the viscoelastic member is disposed.

DETAILED DESCRIPTION OF THE PREFERRED EMBODIMENTS

Hereinafter, an embodiment of a belt line portion sound insulation structure (which may be hereinafter simply referred to as "sound insulation structure") and door glass for an automobile (which may be hereinafter simply referred to as "door glass") will be explained with reference to drawings. It should be noted that the present invention is not limited to the embodiment, and the embodiment can be changed or modified without departing from the spirit and scope of the present invention.

Figure 1:
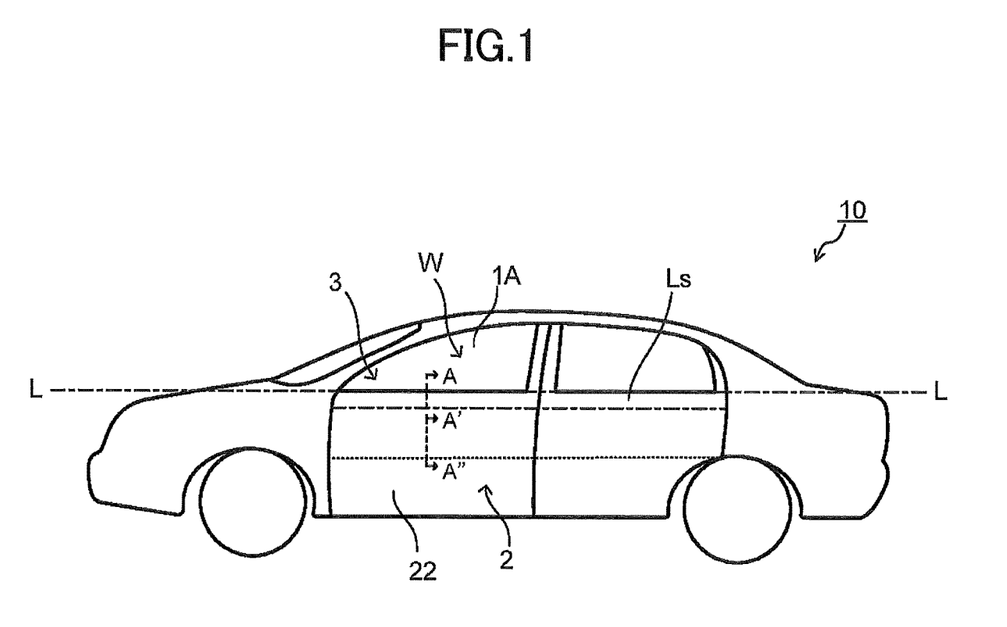
FIG. 1 is a side view illustrating an automobile having a belt line portion sound insulation structure according to the embodiment.
Figure 2:
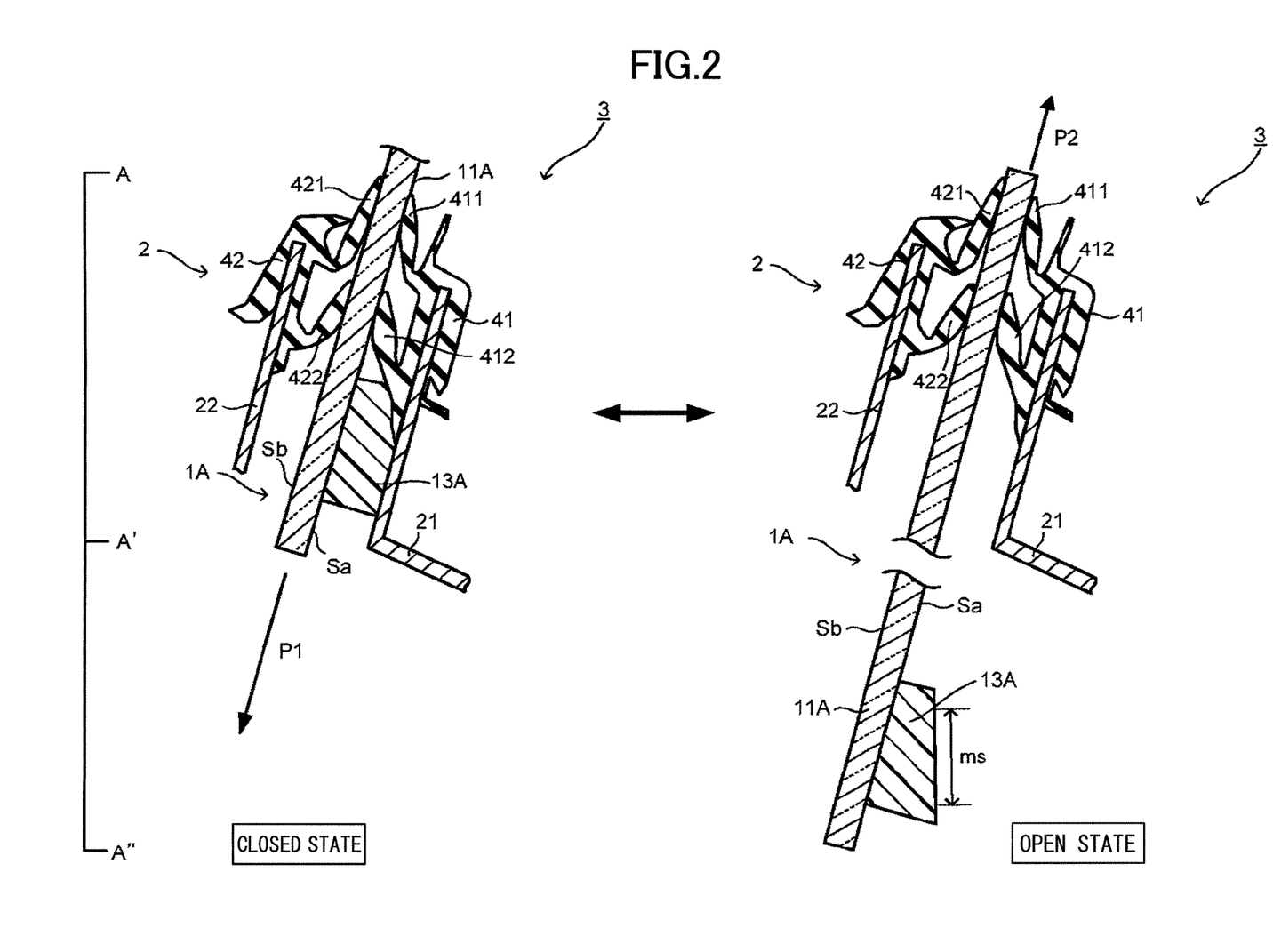
FIG. 2 is a cross-sectional view taken along line A-A'-A" of FIG. 1 schematically illustrating states when door glass is closed and opened according to an example of a belt line portion sound insulation structure of the embodiment.

FIG. 1 is a side view illustrating an automobile having a belt line portion sound insulation structure which is an example of an embodiment illustrated in FIG. 2. In the automobile 10 illustrated in FIG. 1, each of the front and rear side doors 3 includes a door panel 2 and door glass 1A provided in the door panel 2 so as to be movable up and down, and FIG. 1 illustrates the state of the automobile 10 with the door glass 1 closed.

In the side door 3, the door panel 2 includes two panel plates facing each other (FIG. 1 illustrates only panel plate 22 on the outside of the vehicle). The door glass 1A is arranged between the two panel plates so as to be movable up and down. Accordingly, when the door glass 1A is closed, the window opening portion W is closed by the door glass 1A, and when the door glass 1A is opened, the window opening portion W is in the open state. In this specification, of the two panel plates of the door panel, a panel plate located at the vehicle inner side will be referred to as an inner panel, and the panel plate located at the vehicle outer side will be referred to as an outer panel.

In the automobile 10, a belt line L is a line connecting the upper ends of the front and rear door panels 2. In the embodiment, a region having a predetermined width below the upper end of the door panel 2 along the belt line L is referred to as a belt line portion, and is indicated by Ls in FIG. 1. The side door 3 of the automobile 10 is configured such that a structure for sound insulation is obtained in the belt line portion Ls when the door glass 1A is closed.

FIG. 2 is a cross-sectional view illustrating the side door 3 taken along line A-A'-A" of FIG. 1 when the door glass 1A is closed and opened according to the example of a belt line portion sound insulation structure of the embodiment. Hereinafter, the closed state of the door glass 1A and the open state of the door glass 1A will also be simply referred to as a "closed state" and an "open state", respectively. A dotted line indicated with the door panel 2 in FIG. 1 indicates the position of the lower end of the door glass 1A when the door glass 1A descends to the bottom and the window opening portion W is fully opened. When the door glass 1A in the closed state is lowered in the direction of arrow P1, a state in which the door glass 1A is lowered to the bottom is referred to as the open state. Further, when the door glass 1A in the open state is raised in the direction of the arrow P2, the state in which the door glass 1A is fully raised is referred to as the closed state. The cross-sectional view taken along line A-A'-A" of FIG. 1 illustrated in the open state of FIG. 2 includes the cross sectional view of the entire door glass 1A.

[Sound Insulation Structure]

The sound insulation structure of the belt line portion illustrated in FIG. 2 will be explained. The door panel 2 includes an inner panel 21 and an outer panel 22 as two panel plates facing each other, and the door glass 1A is arranged between the inner panel 21 and the outer panel 22 so as to be movable up and down. The inner panel 21 and the outer panel 22 have, as seal members for sealing between the belt glass 1A and the belt line portion, an inner seal portion material 41 and an outer seal portion material 42, respectively, in the belt line portion, which is a region along the belt line, on the opposing surfaces. In this specification, "inner" is a prefix given to a member arranged at the inner side of the vehicle with respect to the door glass, and "outer" is a prefix given to a member arranged at the outer side of the vehicle with respect to the door glass.

The inner seal portion material 41 includes two lip portions, i.e., an upper inner lip 411 and a lower inner lip 412, on the upper and lower positions at the side of the door glass 1A. Similarly, the outer seal portion material 42 includes an upper outer lip 421 and a lower outer lip 422 at the side of the door glass 1A. The inner seal portion material 41 and the outer seal portion material 42 are formed of a synthetic rubber such as ethylene propylene rubber (EPDM rubber), a thermoplastic elastomer such as a polyolefin-based elastomer, or the like.

In the sound insulation structure according to the embodiment, the shapes of the inner seal portion material 41 and the outer seal portion material 42 are not limited thereto. The seal member in the sound insulation structure according to the embodiment can be a seal member having a structure similar to a seal member generally used for a belt line portion of an automobile. In the configuration of generally-used seal member, for example, there may be only one lip portion.

The door glass 1A includes a glass plate 11A and a viscoelastic member 13A as illustrated in the cross-sectional view of the entirety in the open state in FIG. 2. The hardness measured on the surface of the viscoelastic member 13A is 10 to 80 in terms of Asker C hardness defined by SRIS 0101 under a temperature condition of 23 degrees Celsius±2 degrees Celsius. In the present specification, the term "Asker C hardness" refers to the Asker C hardness measured under the above condition unless otherwise specified.

The glass plate 11A included in the door glass 1A is not particularly limited as long as it is a transparent plate-like body generally used for a vehicle window. Examples of the shapes include a flat plate shape and a curved shape. The shape of the principal surface is adapted to the window opening portion of the vehicle to be mounted. The glass plate 11A may be general-purpose plate glass, tempered glass, or wired glass. The thickness of the glass plate 11A is approximately 2.8 to 5.0 mm, depending on the type of the vehicle. Further, the glass plate 11A may be a single glass plate, i.e., so-called single plate glass, laminated glass obtained by bonding a plurality of glass plates through an intermediate layer, or insulating glass obtained by overlaying a plurality of sheets so as to have an air layer with a spacer. Even when the glass plate 11A is a single glass plate, combining this glass plate 11A with the viscoelastic member 13A provides an excellent sound insulation property at a low cost without using laminated glass having a sound insulation property.

Examples of the glass used for the glass plate 11A include transparent inorganic glass or organic glass (resin). Specific examples of the inorganic glass include generally-used soda lime glass, borosilicate glass, alkali-free glass, and quartz glass. As the glass, glass that absorbs ultraviolet rays or infrared rays can be used. Examples of the resin include acrylic resins such as polymethyl methacrylate, aromatic polycarbonate resins such as polyphenylene carbonate, and polystyrene resins.

The viscoelastic member 13A is arranged on a lower portion of the principal surface Sa at the vehicle inner side of the glass plate 11A. As illustrated in FIG. 2, in the closed state of the door glass 1A, the viscoelastic member 13A is restrained by the arrangement area on the glass plate 11A where of the viscoelastic member 13A is disposed and a part of the surface of the inner panel 21 at the side of the door glass 1A. The lower portion of the glass plate 11A is a region where the viscoelastic member 13A can be restrained by the glass plate 11A and the part of the surface of the inner panel 21 at the side of the door glass 1A in the closed state of the door glass 1A.

In the sound insulation structure according to the embodiment, the viscoelastic member may have a configuration in which at least a part of the viscoelastic member is restrained by a part of the glass surface of the door glass and a part of the surface of the panel plate at the side of the door glass in the closed state of the door glass. For example, as illustrated in the closed state of FIG. 2, it may be configured such that the upper portion of the viscoelastic member 13A is sandwiched between the inner seal portion material 41 and the glass plate 11A, and the lower portion of the viscoelastic member 13A is restrained by the glass plate 11A and a part of the surface of the inner panel 21 at the side of the door glass 1A.

According to the sound insulation structure illustrated in FIG. 2, the viscoelastic member 13A having an Asker C hardness of 10 to 80 is sandwiched, in a close contact manner, between the glass plate 11A and the inner panel 21, and further between the glass plate 11A and the lower portion of the inner seal portion material 41, thus enabling the inside of the vehicle to be sealed. Therefore, the amount of sound entering the vehicle through the belt line portion in the closed state of the door glass can be sufficiently suppressed. In addition, the viscoelastic member 13A is restrained between the glass plate 11A and the inner panel 21, thereby forming a restrained vibration damping structure.

Here, the term "restrained" means a state in which the viscoelastic member 13A is sandwiched between the glass plate 11A and the inner panel 21, and the movement of the viscoelastic member 13A is restricted. Therefore, the vibration of the glass plate 11A can be sufficiently suppressed, and a high sound insulation effect in the inside of the vehicle in the closed state of the door glass can be achieved. The causes for vibration of the glass plate of the door glass includes propagation of road noise from the door panel to the glass plate of the door glass, propagation of engine noise, and the like. According to the belt line portion sound insulation structure of the embodiment, the vibration of the glass plate in the door glass due to any cause can be sufficiently suppressed.

Further, a case where the viscoelastic member 13A is sandwiched between the glass plate 11A and the two upper and lower inner lips 411 and 412 can also be a restrained structure. In this case, in order to obtain a sufficient vibration damping property for the glass plate, it is preferable that the Asker C hardness of a portion of the inner seal portion material in contact with the viscoelastic member is preferably larger than the Asker C hardness of the viscoelastic member, and is preferably larger than the Asker C hardness of the viscoelastic member by five or more, more preferably by 10 or more, and still more preferably by 15 or more.

Furthermore, the viscoelastic member 13A has an Asker C hardness of 10 to 80, so that it effectively blocks the sound of entering the vehicle through the belt line portion. The details will be described later.

The sound entering the vehicle through the belt line portion is actually a sound entering the vehicle from within the door panel 2 through the belt line portion. Here, when the sound is reflected in the door panel 2 by the viscoelastic member 13A, the amount of the sound entering the vehicle through the belt line portion is reduced, but it is assumed that the reflected sound enters the vehicle through a portion located below the belt line portion of the inner door panel.

The viscoelastic member 13A preferably has a good balance between sound absorption property and sound insulation property. As a result, it is possible to reduce the sound that enters the vehicle from the door panel through the belt line portion due to the effect of sound insulation property. In addition, since the viscoelastic member 13A has sound absorption property, particularly when a layer made of a foaming material is included, the sound entering the vehicle can be reduced by the sound absorption effect of the bubble structure.

(Physical Properties of Viscoelastic Member 13A)

The viscoelastic member 13A is made of a material having viscoelasticity (hereinafter also referred to as "viscoelastic material"), and has an Asker C hardness of 10 to 80. Since the viscoelastic member 13A has such characteristics, the sound insulation property and the vibration damping property in the door glass closed state can be achieved in the sound insulation structure according to the embodiment.

When the Asker C hardness is in the range of 10 to 80, the viscoelastic member 13A has a desired sound insulation property (a property including both of sound absorption property and sound blocking property), with which the amount of sound entering the vehicle can be reduced. When the Asker C hardness is 10 or more, the amount of sound passing through the viscoelastic member 13A can be effectively reduced, so that the amount of sound entering the vehicle through the belt line portion can be greatly reduced. When the Asker C hardness is 80 or less, the amount of sound absorbed by the viscoelastic member 13A increases, the amount of sound that passes through the inner door panel and enters the vehicle is reduced, and the amount of sound that enters the vehicle can be greatly reduced. In addition, when the Asker C hardness of the viscoelastic member 13A is in the range of 10 to 80, the viscoelastic member 13A has an appropriate shape following property, and when the viscoelastic member 13A is sandwiched between the glass plate 11A and the inner panel 21 in the closed state of the door glass, the viscoelastic member 13A is deformed and the surface can come into close contact with the inner panel 21 and the inner seal portion material 41 with a good sealing property, and the sound insulation property and the vibration damping property are excellent.

The Asker C hardness of the viscoelastic member 13A is preferably 10 to 78, more preferably 15 to 60, and still more preferably 28 to 40. The Asker C hardness of the viscoelastic member 13A is a hardness measured on the surface of the viscoelastic member 13A. The viscoelastic member 13A may include a single viscoelastic material or a plurality of viscoelastic materials.

When the viscoelastic member 13A is composed of a single viscoelastic material, the Asker C hardness of the viscoelastic material is 10 to 80. When the viscoelastic member 13A is composed of a plurality of viscoelastic materials, the Asker C hardness of each viscoelastic material is not necessarily in the range of 10 to 80. The Asker C hardness of the viscoelastic member 13A obtained using a plurality of viscoelastic materials may be in the range of 10 to 80. It should be noted that the Asker C hardness is measured on the surface at a central portion excluding the end of the viscoelastic member 13A (indicated by "ms" in FIG. 2), for example, the Asker C hardness is measured at a position 12 mm or more inside of the end portion on the surface of the viscoelastic member 13A at the side of the inner panel 21.

Specific examples of viscoelastic materials satisfying the Asker C hardness of 10 to 80 include materials obtained by adjusting, to 10 to 80, the Asker C hardness of a viscoelastic materials made of, e.g., synthetic rubbers such as an EPDM rubber, thermoplastic elastomer resins such as a polyolefin elastomer and a polystyrene elastomer, a polyurethane resin, a polyvinyl chloride resin, an epoxy resin, a silicone gel, a polynorbornene, or the like, and optimizing other properties.

Further, the viscoelastic material constituting the viscoelastic member 13A may include a filler such as an organic filler or a mineral filler. For example, resin particles formed from resins such as crosslinked polyester, polystyrene, styrene-acrylic copolymer resin, urea resin, or the like, synthetic fibers, and natural fibers are used as the organic filler.

Examples of mineral fillers include calcium carbonate, calcium oxide, magnesium hydroxide, magnesium oxide, magnesium carbonate, aluminum hydroxide, barium sulfate, barium oxide, titanium oxide, iron oxide, zinc oxide, zinc carbonate, clays such as wax stone clay, kaolin clay, calcined clay, and the like, and inorganic fillers such as mica, diatomaceous earth, carbon black, silica, glass fiber, carbon fiber, fibrous filler, glass balloons, and the like. Thus, by including the filler, the Asker C hardness, the Young's modulus, and the loss factor of the viscoelastic member 13A can be adjusted to desired values.

The viscoelastic member 13A is preferably made of a foaming material so as to have an Asker C hardness of 10 to 80. When the viscoelastic member 13A is made of a foaming material, the viscoelastic member 13A is preferably a polymer foaming material having an Asker C hardness of 10 to 80 made by foaming a polymer material such as the viscoelastic material or resins other than the viscoelastic material by a conventional method. Examples of polymer materials constituting the skeleton of the polymer foaming material include the above-mentioned viscoelastic materials, polystyrene, polyolefin (polyethylene, polypropylene, etc.), phenol resin, polyvinyl chloride, urea resin, silicone, polyimide, melamine resin, and ethylene vinyl acetate copolymer (EVA).

The foaming material is composed of a skeleton and bubbles (voids). The material constituting the skeleton of the foaming material is preferably the above-described polymer materials, and among the polymer materials listed above, polyurethane resin, EPDM rubber, polyethylene, polypropylene, polystyrene, EVA, and the like are preferable, and the polyurethane resin is particularly preferable. These materials are excellent in restoration against compression.

The porosity of the foaming material is preferably 63% to 80%, more preferably 71% to 77%. It should be noted that the porosity is derived as "porosity [%]=1−(apparent density/true density)×100" using the apparent density (density of the entire sample including the skeleton and voids) and the true density (density of the material constituting the skeleton). When the porosity of the foam is in the above range, both of the effect of the sound absorption property and the effect of the sound insulation property can be expected, which is preferable.

The average cell diameter of the foaming material is preferably from 0.10 to 0.56 mm, and more preferably from 0.21 to 0.33 mm. The average bubble diameter can be derived, for example, as the average of the diameters of 20 bubbles using a scanning electron micrograph of a cross section of a foaming material in accordance with the test method of ASTM D2842-69. The bubble diameter is, for example, the average of the maximum diameter and the minimum diameter. When the average cell diameter of the foaming material is in the above range, both of the sound absorption effect and the sound insulation effect can be expected, which is preferable.

Foaming materials are classified into a closed-cell foaming material, an open-cell foaming material, and a semi-closed-cell foaming material according to the form of the cells. In the closed cell foaming material, bubbles exist independently in the foam. In the open cell foaming material, bubbles are formed in a connected manner, and for example, when a cross section of the foaming material is observed, a void is formed in a connected manner from one end to the other end of the foaming material. The semi-closed cell foaming material has a part where bubbles are connected in the foaming material, but the ratio of such a part is smaller than that of the open cell foaming material.

In the open cell foaming material, sound can propagate through the void and pass through the foaming material. However, the energy is attenuated by reverberating the sound while propagating through the void. Furthermore, the sound energy is attenuated by friction near the boundary between the void and the skeleton. That is, the open-cell foaming material has a sound absorption property that absorbs sound that passes through it. On the other hand, since the open cell foaming material propagates the sound through the air gap, the sound insulation effect achieved by blocking the entry of sound itself is small.

In the case of closed-cell foaming materials, sound does not appreciably propagate through voids unlike open-cell foaming materials. The sound insulation effect is higher than that of the open cell foaming material.

In the case of a semi-closed cell foaming material, the semi-closed cell foaming material has both of the sound insulation effect achieved by absorbing sound due to energy attenuation caused by reverberation and friction, and the sound insulation effect achieved by blocking the passage of sound.

In view of the above-described bubble shapes and the characteristics of the sound insulation property arising from the bubble shapes, the foaming material constituting the viscoelastic member is preferably the closed-cell foaming material or the semi-closed-cell foaming material. In the present specification, the semi-closed cell foaming material refers to a foam having an open cell ratio of about 30% to 80%, and a foaming material having an open cell ratio of less than 30% is referred to as a closed cell foaming material, and a foaming material having an open cell ratio of more than 80% is referred to as an open cell foaming material. The open cell ratio can be measured according to ASTM D-2856-87.

In addition, there exists an air flow resistance value as an index for measuring a sound absorption property in which sound is absorbed by energy attenuation due to reverberation or friction when sound propagates through a void in a foaming material. It has been discovered that in a case where the viscoelastic member 13A is made of a foaming material or includes a layer made of a foaming material, when the air flow resistance value of the foaming material has a specific range, an excellent sound insulation property is exhibited due to a synergetic effect with the belt line portion sound insulation structure for the automobile according to the embodiment. The air flow resistance value of the foaming material measured in accordance with the ISO 9053 direct current method at a temperature of 23 degrees Celsius±2 degrees Celsius is preferably $1.0 \times 10^4$ to $1.0 \times 10^8$ (N·s/m$^4$). The air flow resistance value of the foaming material is a value measured in the open state of the door glass. Similarly, in this specification, the physical property values of the viscoelastic member are all values measured in the open state of the door glass.

If the air flow resistance value of the foaming material is in the above range, when the viscoelastic member 13A has a structure sandwiched between the glass plate 11A and the inner panel 21 in the closed state of the door glass, sound insulation property is significantly high because sound is absorbed without being reflected on the surface of viscoelastic member 13A. The air flow resistance value is more preferably $1.0 \times 10^5$ to $1.0 \times 10^7$ (N·s/m$^4$). The air flow resistance value can be measured, for example, through a flow resistance measurement system AirReSys (conforming to ISO 9053 direct current method) manufactured by Nippon Acoustic Engineering.

In the viscoelastic member 13A, the Young's modulus E (N/m$^2$) at 20 degrees Celsius and the loss coefficient tan δ at 20 degrees Celsius and a vibration frequency of 4000 Hz preferably satisfy the following expression (1). In this specification, unless otherwise specified, the Young's modulus indicates a value at 20 degrees Celsius, and the loss coefficient indicates a value at 20 degrees Celsius and a vibration frequency of 4000 Hz.

[Math 1]

$$E \geq 2.64 \times 10^2 \frac{1 + \tan^2 \delta}{\tan \delta} \quad (1)$$

In the above, the Young's modulus E is an index for measuring the hardness of the viscoelastic member 13A, and the loss coefficient tan δ is an index for measuring the viscosity of the viscoelastic member 13A. Since the Young's modulus E and the loss coefficient tan δ are in the ranges satisfying the above equation (1), the viscoelastic member 13A exhibits a good balance between the intrusion prevention effect of sound and the vibration damping effect for the glass plate 11A, and has excellent sound insulation effect.

In a case where the viscoelastic member 13A is composed of a single viscoelastic material, it is preferable that the relationship between the Young's modulus and the loss coefficient in the viscoelastic material satisfies the above expression (1). Further, in a case where the viscoelastic member 13A is composed of a plurality of viscoelastic materials, the relationship between the Young's modulus and the loss coefficient in each of the viscoelastic materials does not necessarily satisfy the above expression (1), and in the viscoelastic member 13A obtained using the plurality of viscoelastic materials, the relationship between the Young's modulus and the loss coefficient preferably satisfies the above expression (1).

In the viscoelastic member 13A, the Young's modulus E and the loss coefficient tan δ preferably satisfy the following expression (2), and more preferably satisfy the following expression (3).

[Math 2]

$$E \geq 1.05 \times 10^4 \frac{1 + \tan^2 \delta}{\tan \delta} \quad (2)$$

$$E \geq 1.65 \times 10^5 \frac{1 + \tan^2 \delta}{\tan \delta} \quad (3)$$

(Shape of Viscoelastic Member)

The shape of the viscoelastic member 13A is preferably such that the cross-sectional shape taken along the vertical direction of the viscoelastic member 13A is in a tapered shape tapered toward the upper end of the viscoelastic member 13A in the open state of the door glass 1A. In the viscoelastic member 13A illustrated in FIG. 2, the cross-sectional shape is a substantially trapezoidal shape whose upper side is shorter than the lower side. Unlike the cross-sectional shape in the open state, the shape of the viscoelastic member 13A in the closed state of the door glass 1A is a shape that is sandwiched by the glass plate 11A and by a region from the lower portion of the inner seal portion material 41 to the inner panel 21. Thus, the viscoelastic member 13A forms a restrained vibration damping structure restrained between the glass plate 11A and the inner panel 21 in the closed state of the door glass 1A.

In the sound insulation structure according to the embodiment, the shape of the viscoelastic member 13A is not limited to the shape illustrated in FIG. 2. The shape of the viscoelastic member 13A is not particularly limited as long as the viscoelastic member 13A can be restrained between the glass plate 11A and the inner panel 21 in the closed state of the door glass 1A.

The thickness of the viscoelastic member 13A is not particularly limited as long as it is a thickness that can be restrained between the glass plate 11A and the inner panel 21 in the belt line portion in the closed state of the door glass 1A, and the thickness of the viscoelastic member 13A can be appropriately set according to the distance between the glass plate 11A and the inner panel 21 in the belt line portion.

Depending on the vehicle model, for example, in the viscoelastic member 13A where the shape of the cross section taken along the vertical direction in the open state of the door glass 1A is a substantially trapezoidal shape (however, the upper side<the lower side), the upper side length of the cross section is preferably 5 to 25 mm and the lower side is preferably 10 to 30 mm in the open state of the door glass 1A. The upper side length is more preferably 10 to 20 mm, and the lower side length is more preferably 20 to 25 mm.

The length in the vertical direction of the viscoelastic member 13A is preferably 5 to 25 cm, more preferably 7 to 22 cm, and particularly preferably 8 to 20 cm.

The viscoelastic member 13A may have a concave shape having a predetermined radius of curvature R on the surface that comes into contact with the lower inner lip 412 in the closed state of the door glass 1A. With this structure, the viscoelastic member 13A is adapted to and comes into contact with the shape of the lower inner lip 412, thereby improving the sealing property and improving the sound insulation property.

The viscoelastic member 13A illustrated in FIG. 2 has different cross-sectional shapes in the open state and the closed state of the door glass 1A as described above. This is because the viscoelastic member 13A has a predetermined Asker C hardness, which enables moderate elastic deformation. Thus, in the sound insulation structure according to the embodiment, it is preferable that the viscoelastic member 13A is moderately elastically deformable.

Where the viscoelastic member 13A is elastically deformable, in the process from when the viscoelastic member 13A enters the gap between the glass plate 11A and the inner panel 21 to a state in which the viscoelastic member 13A is ultimately restrained between the glass plate 11A and the inner panel 21 when the door glass 1A is closed from the open state of the door glass 1A, the viscoelastic member 13A can be elastically deformed so that the thickness gradually decreases from the forward side to the backward side in the traveling direction of the door glass 1A.

That is, since the viscoelastic member 13A is elastically deformable even with the thickness being larger in the open state of the door glass 1A than in the closed state of the door glass 1A, the viscoelastic member 13A can be reduced in the thickness in the closed state of the door glass 1A as compared with that in the open state of the door glass 1A. The thickness reduction range is preferably 3 to 30% with respect to the thickness of the viscoelastic member 1A in the open state. When the thickness reduction range is within this range, the restrained structure can be formed, and noise generation due to excessive friction during opening and closing can be suppressed. As a result, in the closed state of the door glass 1A, the gap between the glass plate 11A and the inner panel 21 can be closed in a more close contact manner, the inside of the vehicle can be sealed, and a more stable restrained vibration damping structure can be formed. For this reason, the sound insulation effect by the viscoelastic member 13A is improved.

Also, the extent of the viscoelastic member 13A in the vertical direction is not particularly limited, as long as it is an extent such that at least a part of the viscoelastic member 13A closes the gap between the glass plate 11A and the inner panel 21 in the belt line portion in the closed state of the door glass 1A, and the vibration damping structure is formed. In the closed state of the door glass 1A, the upper end of the viscoelastic member 13A is preferably located below the upper end of the inner seal portion material 41, and more preferably located between the upper end and the lower end of the inner seal portion material 41. The lower end of the viscoelastic member 13A is set to a position where the viscoelastic member 13A is restrained between the glass plate 11A and the inner panel 21 within a predetermined range from the lower end of the inner seal portion material 41, and a sufficient sound insulation effect is obtained.

The viscoelastic member 13A is provided on a principal face of the glass plate 11A, and the viscoelastic member 13A illustrated in FIG. 2 is provided in the horizontal direction (hereinafter also referred to as "width direction") connecting the left and right ends of the principal surface Sa at the vehicle inner side. The position of the region where the viscoelastic member 13A is arranged in the horizontal direction of the glass plate 11A is not particularly limited, and the viscoelastic member 13A may be provided to extend throughout the entirety of the glass plate 11A in the horizontal direction, or may be provided on a part of the glass plate 11A. When the viscoelastic member 13A is provided in a part of the glass plate 11A, the viscoelastic member 13A may be provided in a continuous manner in a part of the glass plate 11A or may be provided in a discontinuous manner. Since the sound insulation effect can be enhanced when the volume of the viscoelastic member 13A is larger, the viscoelastic member 13A is preferably provided over 50% or more of the entire length of the glass plate 11A in the horizontal direction, and more preferably, provided over 80% or more, and still more preferably, the viscoelastic member 13A is provided over the entirety (100%).

On the other hand, in the central portion in the width direction of the door glass, the inner seal portion material 41 tends to be in close contact with the door glass in terms of structure to have a high blocking property of sound. In that case, the viscoelastic member 13A may not be provided in the central portion in the width direction of the glass plate 11A, but may be provided only in the left and right regions. For example, the viscoelastic member 13A may be provided in respective regions up to ¼ to ⅓ of the entire width from the left and right ends of the glass plate 11A.

The installation of the viscoelastic member 13A on the principal surface Sa of the plate glass 11A at the vehicle inner side is made by means of adhesion. The adhesion method is not particularly limited as long as it is a method that has an adhesion strength that can withstand the force attempting to peel off the viscoelastic member 13A that occurs when, due to opening or closing of the door glass 1A, the viscoelastic member 13A ascends or descends together with the glass plate 11A to be restrained or released from a restrained state as described above. More specifically, the viscoelastic member 13A can be bonded with a known double-sided tape, an adhesive agent, or the like.

(Structure of Viscoelastic Member)

As described above, the viscoelastic member 13A may be composed of a single viscoelastic material or a plurality of viscoelastic materials. Examples of aspects in which the viscoelastic member 13A is composed of a plurality of viscoelastic materials include a configuration in which viscoelastic materials are formed and stacked as layers, a configuration including a surface layer part that is in contact with the atmosphere and an inner part arranged inside the surface layer part and made of a viscoelastic material different from that of the surface layer part, and the like.

When the viscoelastic member 13A has a stacked structure, for example, the viscoelastic member 13A is stacked in the direction from the glass plate 11A to the vehicle inner side. In the case of a stacked structure, the viscoelastic member 13A preferably has a two-layer structure including a soft layer having a lower Young's modulus at the side of the glass plate 11A and a layer having a higher Young's modulus than the soft layer at the vehicle inner side, i.e., the front surface layer.

In addition, when the viscoelastic member 13A has a two-layer stacked structure, the viscoelastic member 13A preferably has a two-layer structure including a foaming layer including a polymer material, in particular, a foaming material having a viscoelastic material as a skeleton, at the side of the glass plate 11A, and a non-foaming layer made of non-foaming material (preferably a viscoelastic material) as a front surface layer at the vehicle inner side. Both of the foaming material and the non-foaming material are preferably made of a viscoelastic material. In that case, the viscoelastic material constituting the non-foaming material is preferably the same type as that of the viscoelastic material constituting the skeleton of the foaming material constituting the foaming layer. The foaming material constituting the foaming layer is preferably a closed cell foaming material or a semi-closed cell foaming material. When the viscoelastic member 13A has the two-layer structure including the foaming layer and the non-foaming layer as described above, the thickness of the non-foaming layer is preferably 0.5 to 3 mm, and more preferably 1 to 2 mm.

When the viscoelastic member 13A has the two-layer structure as described above, the wear resistance and the like of the viscoelastic member 13A is improved on the surface at the vehicle inner side, and the durability of the viscoelastic member 13A is improved, and an excellent sound insulation property is achieved for a long period of time.

As explained above, even in a case where the viscoelastic member 13A has a two-layer stacked structure, the Asker C hardness measured on the surface is within the range of the embodiment. Even in a case where the viscoelastic member 13A has a surface made of a different viscoelastic material, the method for measuring Asker C hardness is the same as described above. Further, the relationship between the Young's modulus and the loss coefficient as the entirety of the viscoelastic member 13A preferably satisfies the above expression (1), more preferably the above expression (2), and even more preferably the above expression (3). Further, the air flow resistance value of the foaming layer of the viscoelastic member 13A is preferably within the above range.

Figure 3:
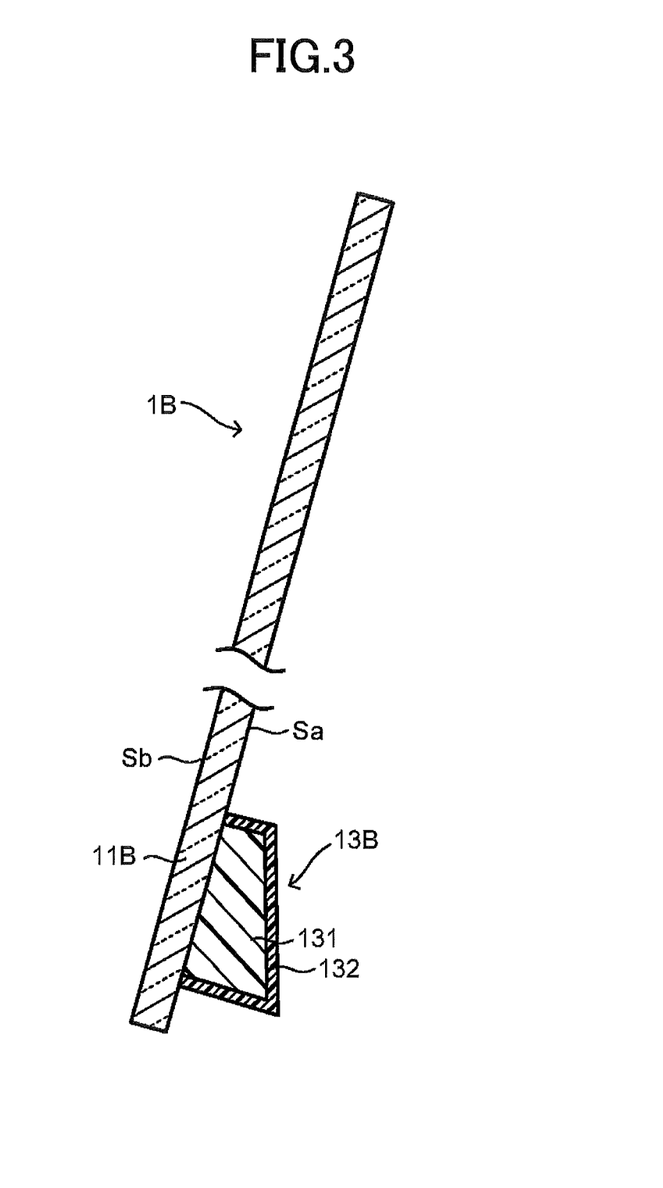
FIG. 3 is a cross-sectional view schematically illustrating another example of a door glass for an automobile according to the embodiment.

FIG. 3 illustrates a cross sectional view illustrating door glass 1B including, instead of the viscoelastic member 13A of the door glass 1A illustrated in FIG. 2, a surface layer part that is in contact with the atmosphere and an inner part arranged inside the surface layer part and made of a viscoelastic material different from that of the surface layer part. FIG. 3 is a cross-sectional view taken along the vertical direction in the open state of the door glass 1B.

The door glass 1B includes a glass plate 11B similar to the glass plate 11A, and a viscoelastic member 13B arranged on the lower portion of the principal surface Sa of the glass plate 11B at the vehicle inner side. The viscoelastic member 13B has a cross sectional shape similar to that of the viscoelastic member 13A, and more specifically the shape of the viscoelastic member 13B is such that the cross-sectional shape taken along the vertical direction of the viscoelastic member 13B is in a tapered shape tapered toward the upper end the viscoelastic member 13B in the open state of the door glass 1B. The lengths of the upper side and the lower side and the length in the vertical direction of the viscoelastic member 13B can be the same as those of the viscoelastic member 13A, including preferred aspects.

The viscoelastic member 13B includes an inner part 131 and a surface layer part 132. The surface layer part 132 is provided so as to cover an upper surface, a lower surface, and an inner-side surface of the inner part 131 in a continuous manner. For example, the inner part 131 may be made of a viscoelastic material having a lower Young's modulus than the surface layer part 132, and the surface layer part 132 may be made of a viscoelastic material having a higher Young's modulus than the inner part 131. The surface layer part 132 may not be a viscoelastic material as necessary. A preferred configuration of the viscoelastic member 13B is a configuration in which the inner part 131 is made of a polymer material, in particular, a foaming material having a viscoelastic material as a skeleton, and the surface layer part 132 is made of a non-foaming material. In that case, the surface layer part 132 is preferably a viscoelastic material. The surface layer part 132 that is a non-foaming material may be, for example, a so-called skin layer that is formed in the surface layer part when the foaming material is foamed and molded in a mold. In this case, the foaming material formed in the mold constitutes the inner part 131.

The foaming material constituting the inner part 131 is preferably a closed cell foaming material or a semi-closed cell foaming material. Both of the foaming material and the non-foaming material are preferably made of viscoelastic material. In that case, the viscoelastic material constituting the non-foaming material of the surface layer part 132 is preferably the same type as that of the viscoelastic material constituting the skeleton of the foaming material of the inner part 131. When the inner part 131 of the viscoelastic member 13B is made of the foaming material and the surface layer part 132 is made of the non-foaming material, the thickness of the surface layer part 132 is preferably 0.5 to 3 mm over the entirety of the viscoelastic member 13B, and more preferably 1 to 2 mm.

When the viscoelastic member is made into a structure like the viscoelastic member 13B, the wear resistance and the like is improved on the surface at the vehicle inner side as compared with the viscoelastic member made of a single viscoelastic material, and the durability as the viscoelastic member is improved. Furthermore, when the inner part 131 is made of the foaming material and the surface layer part 132 is made of the non-foaming material, the occurrence of problems caused by the permeation of moisture such as rainwater into the foaming material can be suppressed, which is advantageous in terms of durability. The surface layer part 132 may not extend on the entire surface of the viscoelastic member 13B.

As explained above, even with a viscoelastic member made of a plurality of materials such as, e.g., the viscoelastic member 13B, in particular, a viscoelastic member made of a plurality of viscoelastic materials, the Asker C hardness measured on the surface of the viscoelastic member 13B is within the range of the embodiment. Further, the relationship between the Young's modulus and the loss coefficient as the entirety of the viscoelastic member 13B preferably satisfies the above expression (1), more preferably the above expression (2), and even more preferably the above expression (3). Further, the air flow resistance value of the foaming material of the inner part 131 of the viscoelastic member 13B is preferably within the above range.

Here, in the present sound insulation structure according to the embodiment, the viscoelastic member 13A is located on the lower portion of the principal surface Sa of the glass plate 11A at the vehicle inner side in order to maintain good drainage of rainwater and the like attached to the vehicle outer side of the glass plate 11A of the door glass 1A. On the other hand, the viscoelastic member 13A may be arranged on the lower portion of the principal surface Sb at the vehicle outer side instead of the vehicle inner side of the glass plate 11A. The viscoelastic member 13A may have a structure for draining water such as rainwater, and may have, for example, a slit or a through hole. The viscoelastic member 13A may have a water repellent layer on the surface. These deformations and changes can also be made with the door glass 1B in a similar manner.

Figure 4:
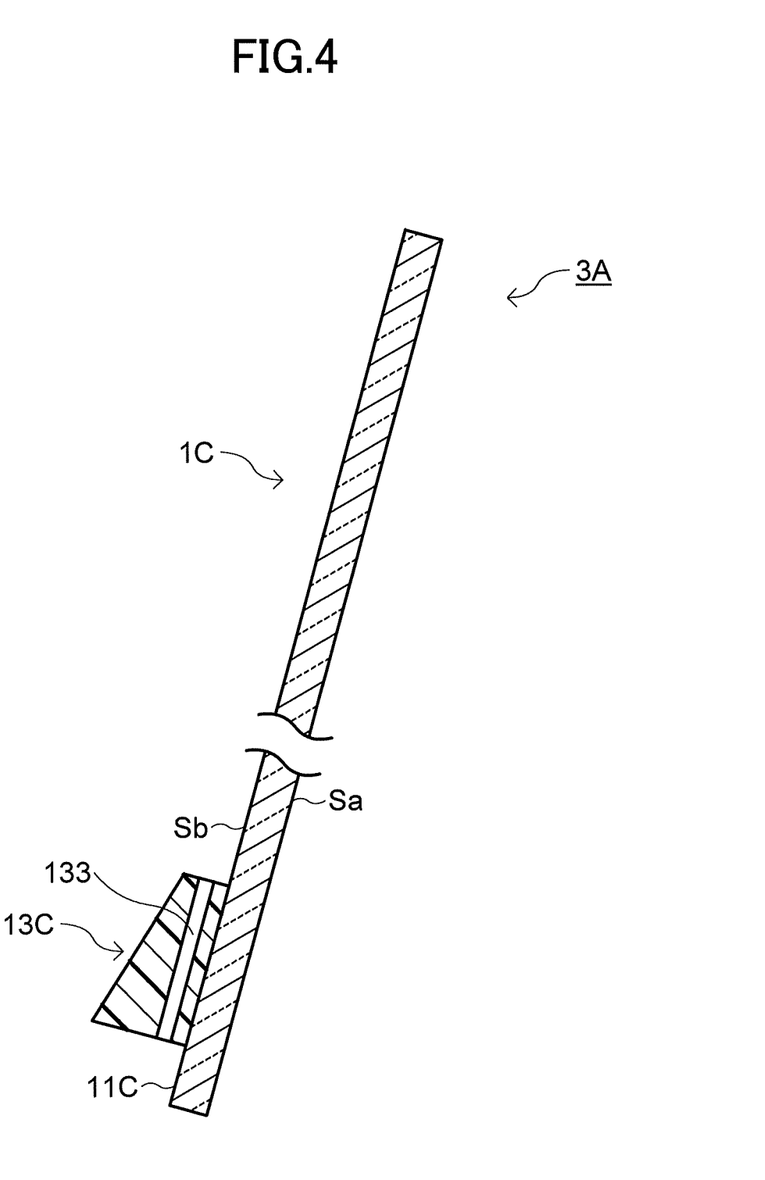
FIG. 4 is a cross-sectional view schematically illustrating still another example of a door glass for an automobile according to the embodiment.

FIG. 4 illustrates a cross sectional view illustrating door glass 1C provided in a side door 3A and including a viscoelastic member 13C. The viscoelastic member 13C is configured in a manner similar to the viscoelastic member 13A, but is different in that the viscoelastic member 13C is provided with through holes 133 for draining water such as rainwater. In contrast to the viscoelastic member 13A, the viscoelastic member 13C is arranged on the lower portion of the principal surface Sb at the vehicle outer side, instead of the vehicle inner side, of a glass plate 11C.

Furthermore, in order to increase the sound insulation effect, the door glass 1A preferably includes the viscoelastic member 13A on the lower portion at the vehicle inner side of the glass plate 11A and includes, on the lower portion of the principal surface Sb at the vehicle outer side, a viscoelastic member made of a viscoelastic material similar to that of the viscoelastic member 13A explained above. More specifically, the door glass 1A preferably includes viscoelastic members on the lower portions at both the vehicle inner side and the vehicle outer side of the glass plate 11A. When the viscoelastic member is arranged on the lower portion of the glass plate 11A, the viscoelastic member is restrained between the glass plate 11A and a part of the inner panel 21 or the outer panel 22 in the closed state of the door glass 1A. As a result, a restrained type vibration damping structure is formed at both of the principal faces of the glass plate 11A. Therefore, the amount of sound entering the vehicle can be sufficiently suppressed, and the vibration of the glass plate 11A can be sufficiently suppressed, thereby realizing a high sound insulation effect in the vehicle in the closed state of the door glass. The same can be achieved with the door glass 1B in a similar manner.

Figure 5:
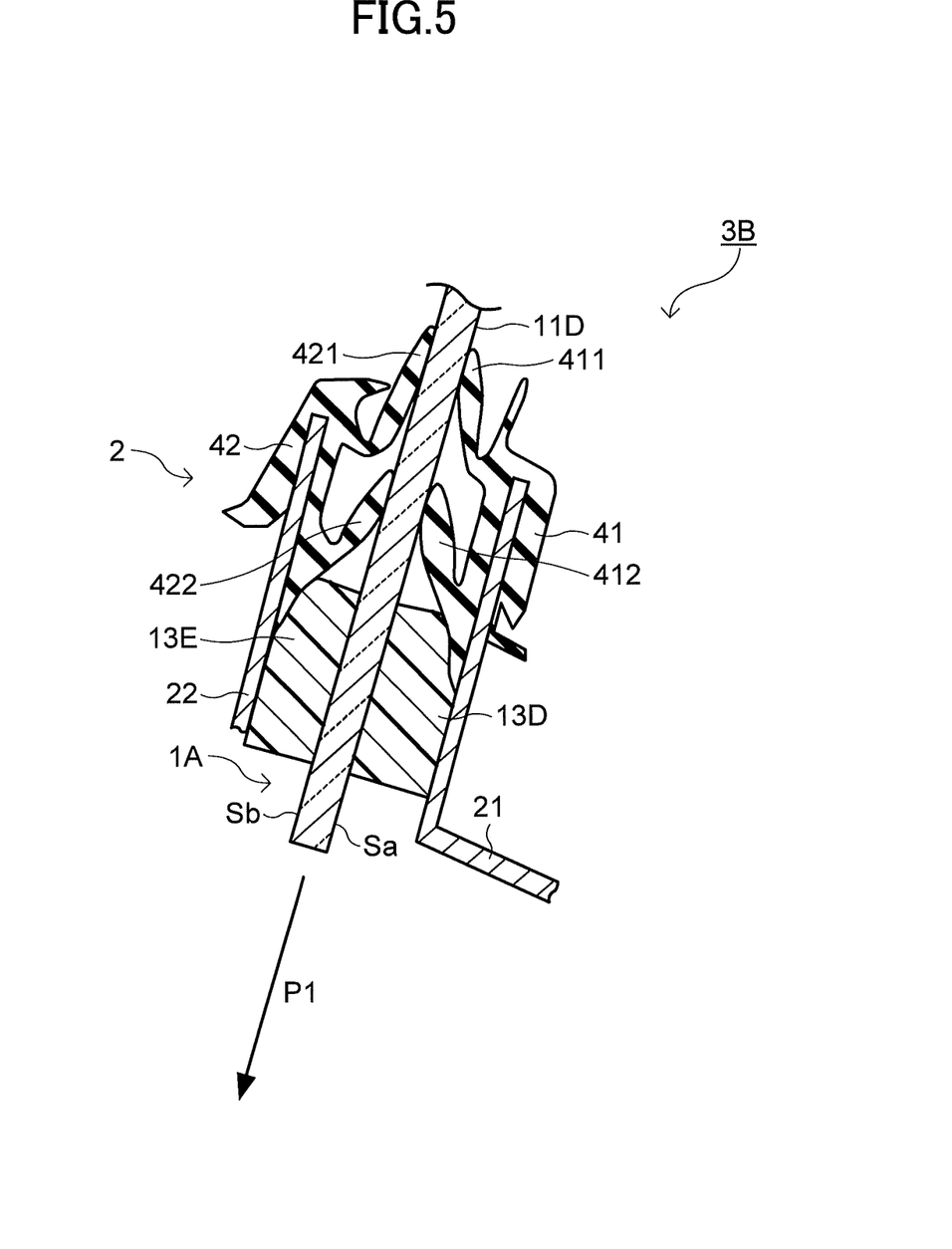
FIG. 5 is a cross-sectional view schematically illustrating another example of a belt line portion sound insulation structure according to the embodiment.

FIG. 5 is a cross-sectional view schematically illustrating another example of a belt line portion sound insulation structure according to the embodiment. The belt line portion sound insulation structure of FIG. 5 has a configuration similar to that of FIG. 2, but is different in that door glass 1A of a side door 3B includes viscoelastic members 13D, 13E on the lower portions at both the vehicle inner side and the vehicle outer side, respectively, of a glass plate 11D. The viscoelastic members 13D, 13E are configured in a manner similar to the viscoelastic member 13A. In FIG. 5, constituent elements similar to those in FIG. 2 are denoted with the same reference numerals as FIG. 2, and explanation thereabout is omitted. In FIG. 5, the outer seal portion material 42 includes an upper outer lip 422 instead of the upper outer lip 421. A lower part of the upper outer lip 422 is formed so that the upper portion of the viscoelastic member 13E is sandwiched between the outer seal portion material 42 and the glass plate 11D, and the lower portion of the viscoelastic member 13E is restrained by the glass plate 11D and a part of the surface of the outer panel 22 at the side of the door glass 1A. According to the belt line portion sound insulation structure of FIG. 5, the effects as explained in the previous paragraph can be achieved.

When the viscoelastic members are provided on both sides of the glass plate 11A, the viscoelastic member at the vehicle outer side may have an Asker C hardness greater than that of the viscoelastic member at the vehicle inner side. In areas where the outside air temperature is high, the outside temperature of the door glass tends to be high, so when the hardness of the viscoelastic member at the vehicle outer side is increased in advance, it is less likely to cause a difference in the hardness of the viscoelastic members between the vehicle outer side and the vehicle inner side. The viscoelastic member at the vehicle outer side is preferably provided with a structure for draining rainwater, such as a slit or a through hole.

When the viscoelastic members are provided on both sides of the glass plate 11A, the viscoelastic member at the vehicle outer side may have an Asker hardness C lower than that of the viscoelastic member at the vehicle inner side. In areas where the outside air temperature is low, the ambient temperature at the vehicle outer side of the door glass tends to be low, so when the hardness of the viscoelastic member at the vehicle outer side is decreased in advance, it is less likely to cause a difference in the hardness of the viscoelastic members between the vehicle outer side and the vehicle inner side.

In addition, the door glass having the above configuration used for the sound insulation structure according to the embodiment can be independently used as door glass for an automobile according to the embodiment. As described above, in the door glass according to the embodiment, the viscoelastic member forms a restrained structure with the door panel and/or the inner seal portion material in the closed state of the door glass, so that a high sound insulation property can be obtained.

As described above, according to the belt line portion sound insulation structure of the automobile according to the embodiment, the amount of sound entering from the outside of the vehicle through the belt line portion is suppressed, and the generation of sound due to the vibration of the glass plate constituting the door glass is suppressed, so that an excellent sound insulation effect can be exhibited. In addition, the sound insulation in the belt line portion does not appreciably cause any increase in the amount of sound entering the vehicle from other routes. According to the door glass for the automobile having the viscoelastic member according to the embodiment, the belt line portion sound insulation structure is formed when the door glass is installed on the automobile, and therefore, an excellent sound insulation effect is exhibited.

EXAMPLES

Hereinafter, the embodiment will be described in more details with reference to examples. The embodiment is not limited to the examples described below. Examples 1 to 4 are examples according to the embodiment, and Example 5 is a comparative example.

Examples 1 to 5

A side door 3 in which door glass 1A, 1B similar to that illustrated in FIG. 2 or FIG. 3 are attached to a door panel 2 was manufactured, and the sound insulation performance was evaluated. In Examples 1 to 5, all the configurations were the same except that the viscoelastic materials constituting the viscoelastic members 13A, 13B were different. In Example 1 to Example 4, the viscoelastic members were the viscoelastic member 13B, the inner part 131 was a foaming material, and the surface layer part 132 was a non-foaming material. Example 5 has the configuration of the viscoelastic member 13A, and the constituent material was a foaming material.

(Manufacture of Door Glass 1A, 1B)

As viscoelastic members 13A and 13B, in Examples, the viscoelastic members 13A and 13B having the structures and physical properties indicated in Table 1 were prepared. The viscoelastic members 13A and 13B used in Examples were made of a urethane material, and the Young's modulus E (N/m²) at a temperature of 20 degrees Celsius and the loss coefficient tan δ at a vibration frequency of 4000 Hz and a temperature of 20 degrees Celsius satisfied the above expression (1).

The Asker C hardness was measured using an Asker Durometer Type C manufactured by Kobunshi Keiki Co., Ltd. The air flow resistance value was measured, for example, through a flow resistance measurement system AirReSys (conforming to ISO 9053 direct current method) manufactured by Nippon Acoustic Engineering.

The viscoelastic members 13A and 13B had a substantially trapezoidal cross-sectional shape taken along the vertical direction in a manner similar to that illustrated in FIG. 2 and FIG. 3. On the cross section, the extent in the vertical direction was 20 mm, the upper side length was 15 mm, the lower side length was 20 mm, and the length of the viscoelastic member 13A was about 850 mm. In viscoelastic member 13B, the thickness of the surface layer part 132 was as indicated in Table 1.

A glass plate for a side door made of soda-lime glass with a thickness of 2 mm was prepared as the glass plate 11A, 11B, and the viscoelastic members 13A, 13B were affixed to a predetermined position of the lower portion of the vehicle inner side surface Sa with an adhesive so that the length direction of the viscoelastic members 13A, 13B were in parallel with the belt line. It should be noted that, as illustrated in FIG. 2, the predetermined position is a position where the viscoelastic member 13A can seal the gap, at the vehicle inner side, between the glass plate 11A and door panel 2 over a region from the lower part of inner seal portion material 41 to the inner panel 21 in the state in which the door glass 1A is attached to the following door panel 2 and the door glass 1A is closed. The arrangement position on the glass plate 11B where the viscoelastic member 13B is disposed was the same as the arrangement position on the glass plate 11A where the viscoelastic member 13A is arranged. The viscoelastic members 13A, 13B extended between the left and right ends of the glass plates 11A, 11B.

(Manufacture of Side Door 3)

As the door panel 2, a door panel 2 having a cross section of a belt line portion Ls similar to that illustrated in FIG. 2 for the front door of automobile, i.e., a door panel 2 including two panel plates 21, 22 facing each other and seal members 41, 42 arranged in a belt line portion Ls of respective opposing surfaces of the panel plates 21, 22, was used. The door glass 1A, 1B was attached so as to be movable up and down so that the door glass 1A, 1B was positioned between the seal members 41, 42 of the door panel 2.

<Sound Insulation Property Measurement of Side Door>

For the obtained side door 3, the door glass 1A and 1B were made into the closed state, and as a case where the sound source was placed outside the vehicle, the sound pressure level (SPL) at ⅓ octave in the inside of the vehicle was measured at 20 degrees Celsius, 50% RH, and a frequency of 20 to 20000 Hz. The SPL measurement was based on JIS A 1416 using AS-20PC5 acoustic measurement system manufactured by Ono Sokki Co., Ltd. It should be noted that this measurement is to measure the sound insulation property of the entire side door 3.

In addition, the SPL in the inside of the vehicle was measured in a similar manner using the door glass 1A which does not include the viscoelastic member 13A and which is composed of only the glass plate 11A, and the average value of the SPLs at a frequency of 1000 to 4000 Hz was adopted as a reference value. A value obtained by subtracting the average value of the SPLs at the frequency of 1000 to 4000 Hz of the SPLs measured in each Example from the reference value was used for the evaluation as ΔSPL [dB]. A larger ΔSPL [dB] means better sound insulation property. The obtained results are indicated in Table 1 together with the configurations and physical properties of the viscoelastic members 13A and 13B.

TABLE 1

| | | Examples | | | | |
|---|---|---|---|---|---|---|
| | | 1 | 2 | 3 | 4 | 5 |
| Configurations and physical properties of viscoelastic members | Configuration | 13B | 13B | 13B | 13B | 13A |
| | Asker C hardness | 10 | 28 | 40 | 78 | 2 |
| | Surface layer part (Non-foaming material) Thickness [mm] | Provided 1.2 mm | Provided 1.5 mm | Provided 1.3 mm | Provided 2.1 mm | Not provided |
| | Foaming material Open cell ratio [%] | 80 | 77 | 71 | 63 | 95 |
| | Average cell diameter [mm] | 0.56 | 0.33 | 0.21 | 0.10 | 0.31 |
| | Bubble structure | Semi-closed cell foaming material | Semi-closed cell foaming material | Semi-closed cell foaming material | Closed cell foaming material | Open cell foaming material |
| | Air flow resistance value [N · s/m$^4$] | — | 1.427 × 10$^5$ | — | — | — |
| Δ SPL [dB] | | 0.8 | 1.0 | 0.9 | 0.5 | 0.3 |

From Table 1, it can be seen that when a viscoelastic member having an Asker C hardness within the range of the embodiment is used as the viscoelastic member, the viscoelastic member has an excellent sound insulation property.

Test Examples 1 to 3

The vibration damping properties of the glass plates by the viscoelastic member used in Example 3 and the viscoelastic member used in Example 5 were evaluated according to the following method.

(Preparation of Glass Plate Having Viscoelastic Member)

As a glass plate, a soda lime glass plate having a length of 350 mm, a width of 750 mm, and a thickness of 5 mm was prepared. On one side or both sides of the glass plate as indicated in Table 2, the viscoelastic members used in Example 3 and Example 5 in Table 1 having a length of 20 mm and a thickness of 20 mm were pasted by an adhesive agent to the entire area along the lower edge portion of the glass plate.

(Test Method)

The left and right end faces of the upper portion of the glass plate having the viscoelastic member obtained above were fixed. At the lower portion of the glass plate having the viscoelastic member, the viscoelastic member was pressed against a plate member that is assumed to be the door panel, and the state where the door glass was closed was reproduced. The glass plate having the viscoelastic member fixed in this manner was vibrated at a frequency of 4000 Hz by an acoustic excitation method. A vibration pickup was attached to a substantially central portion of the glass plate, and vibration acceleration [m/sec$^2$] was measured. A product name "NP-3412" manufactured by Ono Sokki Co., Ltd. was used for the vibration pickup. The results are indicated in Table 2.

TABLE 2

| | Test example 1 | Test example 2 | Test example 3 |
|---|---|---|---|
| Viscoelastic members | Example 3 | Example 3 | Example 5 |
| Pasting configuration | Only one side of glass plate | Both sides of glass plate | Only one side of glass plate |

TABLE 2-continued

| | Test example 1 | Test example 2 | Test example 3 |
|---|---|---|---|
| Vibration acceleration [m/sec$^2$] | 5.7 | 2.8 | 9.4 |

As is clear from Tables 1 and 2, it is understood that, when the viscoelastic member having the Asker C hardness within the range of the embodiment is used as the viscoelastic member, the glass plate has an excellent vibration damping property, resulting in an excellent sound insulation property.

As described above, according to the embodiment, the entry of sound from the outside of the automobile through the belt line portion is suppressed, and generation of sound due to vibration of the glass plate that constitutes the door glass is suppressed. Therefore, the belt line portion sound insulation structure for the automobile and the door glass for the automobile, capable of improving the sound insulation state in the automobile to a high level when the door glass is closed, are provided.

The belt line portion sound insulation structure for the automobile according to the embodiment has a high sound insulation performance, i.e., suppressing the amount of sound that enters from the outside of the vehicle through the belt line portion and suppressing the generation of sound caused by the vibration of the glass plate that constitutes the door glass. In addition, sound insulation in the belt line portion does not appreciably cause any increase in the amount of sound entering the vehicle from other routes. Therefore, when the belt line portion sound insulation structure for the automobile according to the embodiment is used, a high level of sound insulation state can be implemented in the automobile when the door glass is closed.

When the door glass for the automobile according to the embodiment is installed in the automobile, it is possible to constitute the belt line portion sound insulation structure for the automobile according to the embodiment that can achieve a high level of sound insulation state in the automobile when the door glass is closed.

What is claimed is:

1. A belt line portion sound insulation structure for an automobile for providing sound insulation, along a belt line of the automobile, between a door panel and door glass, the belt line portion sound insulation structure, comprising:
  a viscoelastic member comprising an inner part made of a foaming material and a surface layer part made of a material different from the foaming material of the inner part such that the viscoelastic member is configured to be positioned on a lower portion of one of principal faces of a glass plate of the door glass,
  wherein the door panel includes two panel plates facing each other, and the door glass is positioned between the two panel plates so as to be movable up and down, a hardness measured on a surface of the viscoelastic member is in a range of 10 to 80 in an Asker C hardness defined by SRIS 0101, and in a closed state of the door glass, the viscoelastic member is restrained by a portion of a surface of one of the two panel plates facing the one of the principal faces and an area on one of the two panel plates where the viscoelastic member is disposed.

2. The belt line portion sound insulation structure for the automobile according to claim 1, wherein the viscoelastic member comprises a first viscoelastic member and a second viscoelastic member such that the first viscoelastic member is formed on the lower portion of the one of the principal faces of the glass plate and that the second viscoelastic member is formed on a lower portion of another of the principal faces of the glass plate.

3. The belt line portion sound insulation structure for the automobile according to claim 2, wherein the viscoelastic member is formed such that the material of the surface layer part is a non-foaming material.

4. The belt line portion sound insulation structure for the automobile according to claim 2, wherein the foaming material has an open cell ratio of 80% or less.

5. The belt line portion sound insulation structure for the automobile according to claim 1, wherein the viscoelastic member is formed such that the material of the surface layer part is a non-foaming material.

6. The belt line portion sound insulation structure for the automobile according to claim 1, wherein the foaming material has an open cell ratio of 80% or less.

7. The belt line portion sound insulation structure for the automobile according to claim 1, wherein the foaming material has an air flow resistance value of $1.0 \times 10^4$ to $1.0 \times 10^8$ N·s/m$^4$ measured according to ISO 9053 direct current method.

8. The belt line portion sound insulation structure for the automobile according to claim 1, wherein in an open state of the door glass, a shape of a cross section of the viscoelastic member taken along a vertical direction is a tapered shape tapered toward an upper end of the viscoelastic member.

9. The belt line portion sound insulation structure for the automobile according to claim 8, wherein an upper side length of the cross section of the viscoelastic member is in a range of 5 to 25 mm, and a lower side length of the cross section is in a range of 10 to 30 mm.

10. The belt line portion sound insulation structure for the automobile according to claim 1, wherein the viscoelastic member includes a drainage structure.

11. The belt line portion sound insulation structure for the automobile according to claim 1, wherein the glass plate comprises a single glass plate.

12. The belt line portion sound insulation structure for the automobile according to claim 1, wherein the viscoelastic member comprises a first viscoelastic member and a second viscoelastic member such that the first viscoelastic member is formed on the lower portion of the one of the principal faces of the glass plate and that the second viscoelastic member is formed on a lower portion of another of the principal faces of the glass plate, a hardness measured on a surface of the second viscoelastic member is in a range of 10 to 80 in an Asker C hardness defined by SRIS 0101, and in the closed state of the door glass, the second viscoelastic member is restrained by a portion of a surface of a panel plate facing the another of principal faces and an area of the lower portion of the another of the principal faces of the glass plate where the second viscoelastic member is disposed.

13. The belt line portion sound insulation structure for the automobile according to claim 12, wherein the material of the surface layer part in the first and second viscoelastic members is a non-foaming material.

14. A door glass for an automobile, comprising:
  the belt line portion sound insulation structure of claim 1,
  wherein the viscoelastic member of the belt line portion sound insulation structure is positioned on the lower portion of the one of principal faces of the glass plate.

15. A belt line portion sound insulation structure for an automobile for providing sound insulation, along a belt line of the automobile, between a door panel and door glass, the belt line portion sound insulation structure, comprising:
  a viscoelastic member configured to be positioned on a lower portion of one of principal faces of a glass plate of the door glass,
  wherein the door panel includes two panel plates facing each other, and the door glass is positioned between the two panel plates so as to be movable up and down, a hardness measured on a surface of the viscoelastic member is in a range of 10 to 80 in an Asker C hardness defined by SRIS 0101, in a closed state of the door glass, the viscoelastic member is restrained by a portion of a surface of one of the two panel plates facing the one of the principal faces and an area on one of the two panel plates where the viscoelastic member is disposed, in an open state of the door glass, a shape of a cross section of the viscoelastic member taken along a vertical direction is a tapered shape tapered toward an upper end of the viscoelastic member, and an upper side length of the cross section of the viscoelastic member is in a range of 5 to 25 mm, and a lower side length of the cross section is in a range of 10 to 30 mm.

16. The belt line portion sound insulation structure for the automobile according to claim 15, wherein the viscoelastic member includes a drainage structure.

17. The belt line portion sound insulation structure for the automobile according to claim 15, wherein the glass plate comprises a single glass plate.

18. The belt line portion sound insulation structure for the automobile according to claim 15, wherein the viscoelastic member comprises a first viscoelastic member and a second viscoelastic member such that the first viscoelastic member is formed on the lower portion of the one of the principal faces of the glass plate and that the second viscoelastic member is formed on a lower portion of another of the principal faces of the glass plate, a hardness measured on a surface of the second viscoelastic member is in a range of 10 to 80 in an Asker C hardness defined by SRIS 0101, and in the closed state of the door glass, the second viscoelastic member is restrained by a portion of a surface of a panel plate facing the another of principal faces and an area of the lower portion of the another of the principal faces of the glass plate where the second viscoelastic member is disposed.

19. The belt line portion sound insulation structure for the automobile according to claim 18, wherein the second viscoelastic member includes a layer made of a foaming material.

20. A door glass for an automobile, comprising:
the belt line portion sound insulation structure of claim 15,
wherein the viscoelastic member of the belt line portion sound insulation structure is positioned on the lower portion of the one of principal faces of the glass plate.

* * * * *